United States Patent
Yu et al.

(10) Patent No.: US 6,836,848 B2
(45) Date of Patent: Dec. 28, 2004

(54) POWER MANAGEMENT INTEGRATED CIRCUIT FOR OVERRIDING AN INTERNAL FREQUENCY ID CODE OF A PROCESSOR AND FOR PROVIDING FREQUENCY ID VALUE TO A BRIDGE CHIPSET

(75) Inventors: Chia-Hsing Yu, Taipei Hsien (TW); Nai-Shung Chang, Taipei Hsien (TW)

(73) Assignee: VIA Technologies Inc., Hsin-Tien (TW)

(*) Notice: Subject to any disclaimer, the term of this patent is extended or adjusted under 35 U.S.C. 154(b) by 406 days.

(21) Appl. No.: 09/683,243

(22) Filed: Dec. 5, 2001

(65) Prior Publication Data

US 2002/0073346 A1 Jun. 13, 2002

Related U.S. Application Data

(60) Provisional application No. 60/255,618, filed on Dec. 13, 2000.

(51) Int. Cl.[7] .................................................. G06F 1/26
(52) U.S. Cl. ........................................ 713/300; 327/603
(58) Field of Search ................................. 713/300, 320, 713/340; 327/603

(56) References Cited

U.S. PATENT DOCUMENTS 6,035,407 A * 3/2000 Gebara et al. ............... 713/300
6,601,179 B1 * 7/2003 Jackson et al. .............. 713/322
6,691,235 B1 * 2/2004 Garcia et al. ................ 713/300
6,697,952 B1 * 2/2004 King ........................... 713/300
6,732,266 B1 * 5/2004 Anderson et al. ........... 713/100

OTHER PUBLICATIONS

Philips Semiconductors, "PCA9559—System Management ICs", 2000.*
Philips Semiconductors, "PCA9559 5–Bit Multiplexed/ 1–Bit Latched 6–Bit I2C EEPROM", Data Sheet, Jan. 2000.*
California Micro Devices, "CMBUS100—AMD Athlon VID/FID Interface", Data Sheet, Mar. 2002.*
Attansic Technology, "ATXP1—Jumper Free Over Clock Controller", Data Sheet, Revision 1.01, Sep. 2001.*

* cited by examiner

Primary Examiner—Thomas Lee
Assistant Examiner—Albert Wang
(74) Attorney, Agent, or Firm—Winston Hsu

(57) ABSTRACT

An integrated circuit includes voltage identification (VID) logic and frequency identification logic (FID) for a CPU, as well as power good circuitry for indicating the suitability of electrical power supplies. A VID output signal to control a core voltage provided to the CPU is generated according to an input VID signal provided by the CPU, a sleep state signal, and a CPU mobility-type signal. FID, VID and power detection logic all level shift signals as required for external devices. A programmable table enables overriding of output FID and VID values.

14 Claims, 3 Drawing Sheets

POWER MANAGEMENT INTEGRATED CIRCUIT FOR OVERRIDING AN INTERNAL FREQUENCY ID CODE OF A PROCESSOR AND FOR PROVIDING FREQUENCY ID VALUE TO A BRIDGE CHIPSET

BACKGROUND OF INVENTION

1. Field of the Invention

The present invention concerns an integrated circuit. More specifically, an integrated circuit for assisting with power-management functions of a central processing unit is disclosed.

2. Description of the Prior Art

The motherboards of computer systems have a number of components that are used to interface the central processing unit (CPU) with other devices. Each of these components must be laid out and soldered onto the motherboard. Some of the most recent CPUs now available on the market, such as the K7 CPU from Advanced Micro Devices (AMD), have new power management functions that include adjusting the internal operating frequency of the CPU and changing the core voltage of the CPU. When the CPU is running at a lower internal frequency, a lower core voltage may be used. Adjustments to the internal operating mode of the CPU may thereby be made that exchange processing power for reduced consumption of electrical power. This is extremely beneficial in the realm of portable computing, where users wish to extend battery life for as long as possible. An advanced CPU like the K7 is, for most applications, more than sufficiently powerful to handle tasks even at a reduced rate of processing ability.

Unfortunately, to facilitate these power management functions of the CPU, more components are required on the motherboard. Specifically, one set of components is required to interface the voltage regulating abilities of the CPU with the power regulator of the motherboard, and another set of components is required to interface the frequency-adjusting abilities of the processor with the north bridge chipset. As an increase in the total number of components on the motherboard tends to make for a more complicated layout, and requires more soldering during manufacturing of the motherboard, a higher price is incurred by these extra components. Also, these additional components require extra space on the motherboard, space which may already be at a premium.

SUMMARY OF INVENTION

It is therefore a primary objective of this invention to provide an integrated circuit that manages both the voltage regulating and frequency regulating signals coming from a CPU to interface the CPU with other components, notably the north bridge chipset and the power regulator.

The present invention, briefly summarized, discloses an integrated circuit for supporting a processing system. The processing system has a central processing unit (CPU), a north bridge circuit, a south bridge circuit and a power regulator for providing a core voltage to the CPU. The core voltage is provided according to a VID value provided by a plurality of VID_PWM input lines for the power regulator. The integrated circuit includes a CPU_SELECT input line for indicating a type of the CPU as being either desktop or mobile, VID_SOFT input lines for indicating a programmable core voltage requested by the CPU, VID_CPU input lines for indicating a default core voltage of the CPU, a CPUSTOP# input line for indicating a sleep state of the CPU, FID_CPU input lines for indicating a CPU operating frequency, a plurality of power signal input lines, a power detection circuit for determining the suitability of electrical power provided by the power regulator according to the power signal input lines and generating an associated PWRGOOD# signal line, a default sleep VID value corresponding to a default sleep voltage for the CPU, a programmable VID override table, a programmable FID override table, a serial data input line for programming the VID override table and the FID override table, VID_PWM output lines for passing the VID value to the VID_PWM input lines of the power regulator, a VID logic circuit for generating the VID value, FID_CHIP output lines for providing an FID value to the north bridge circuit and the south bridge circuit, a plurality of FID_OVERRIDE output lines for providing the FID value to the CPU, and an FID logic circuit for generating the FID value. The VID value is set equal to one of the following by the VID logic circuit: a value in the programmable VID override table if the programmable VID override table has been programmed by the serial data input line, the value of the VID_SOFT input lines if the CPU_SELECT input line indicates a mobile-type CPU and the PWRGOOD# signal line indicates suitable power conditions, the value of the VID_CPU input lines if the CPU_SELECT input line indicates a mobile-type CPU and the PWRGOOD# signal line indicates unsuitable power conditions, the value of the VID_CPU input lines if the CPU_SELECT input line indicates a desktop-type CPU and the PWRGOOD# signal line indicates suitable power conditions, or the value of the default sleep VID lines if the CPU_SELECT input line indicates a desktop-type CPU and the PWRGOOD# signal line indicates unsuitable power conditions or the CPUSTOP# input line indicates that the CPU is in the sleep state. The FID value is equal to one of the following by the FID logic circuit: a value in the programmable FID override table if the programmable FID override table has been programmed by the serial data input line, or the value of the FID_CPU input lines.

It is an advantage of the present invention that the integrated circuit provides a single package that handles interfacing the power saving functionality of the CPU with other devices. By providing a single package, costs are lowered, space is saved on the motherboard and the motherboard layout is simplified. Additionally, the present invention integrated circuit offers flexibility in that it may be applied to both mobile and desktop type CPUs. Utilizing a serial interface to program the override FID and VID values in the programmable tables reduces the pin count on the circuit package, and hence layout dimensions.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
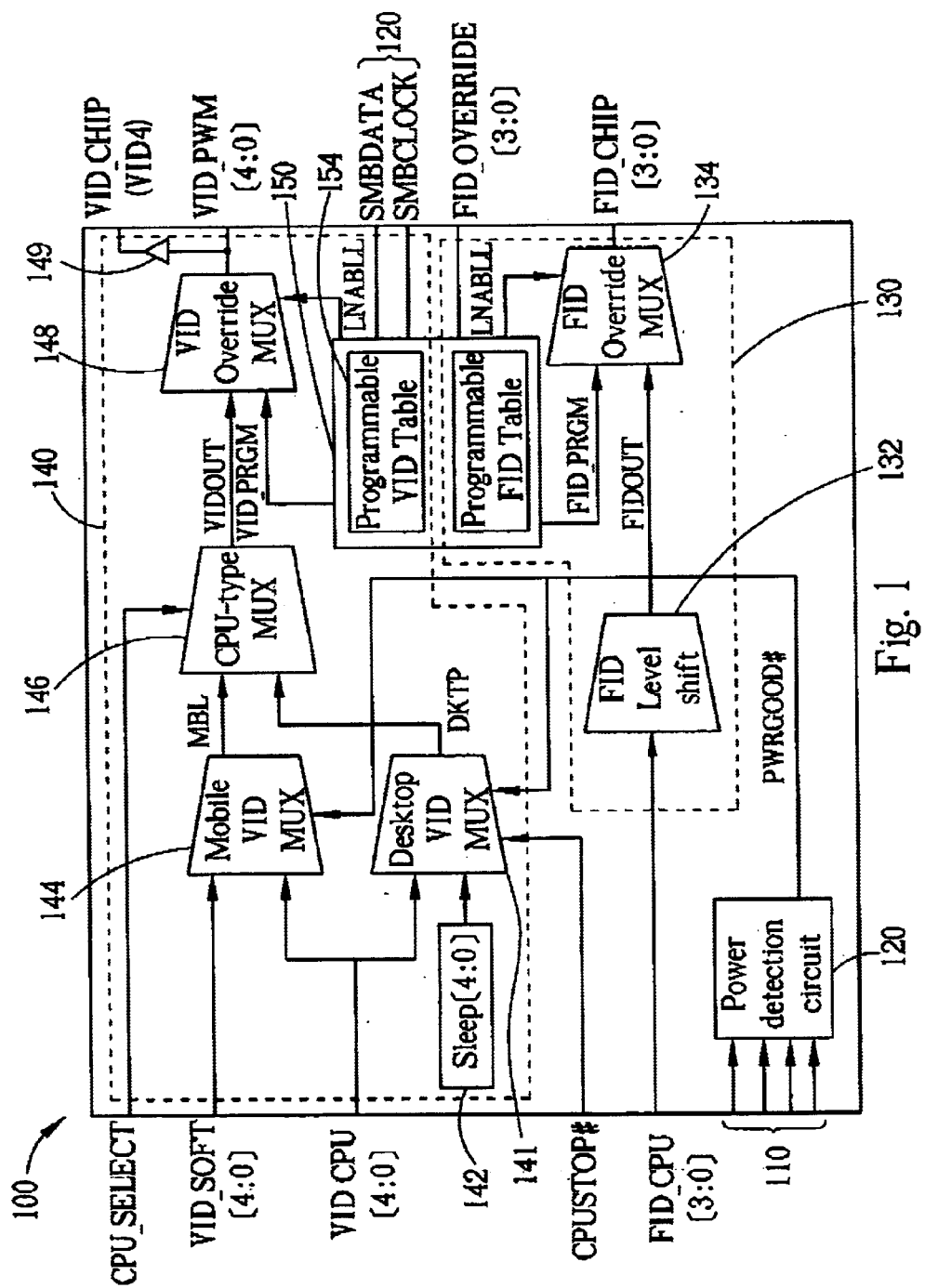
FIG. 1 is a block diagram of an integrated circuit according to the present invention.
Figure 2:
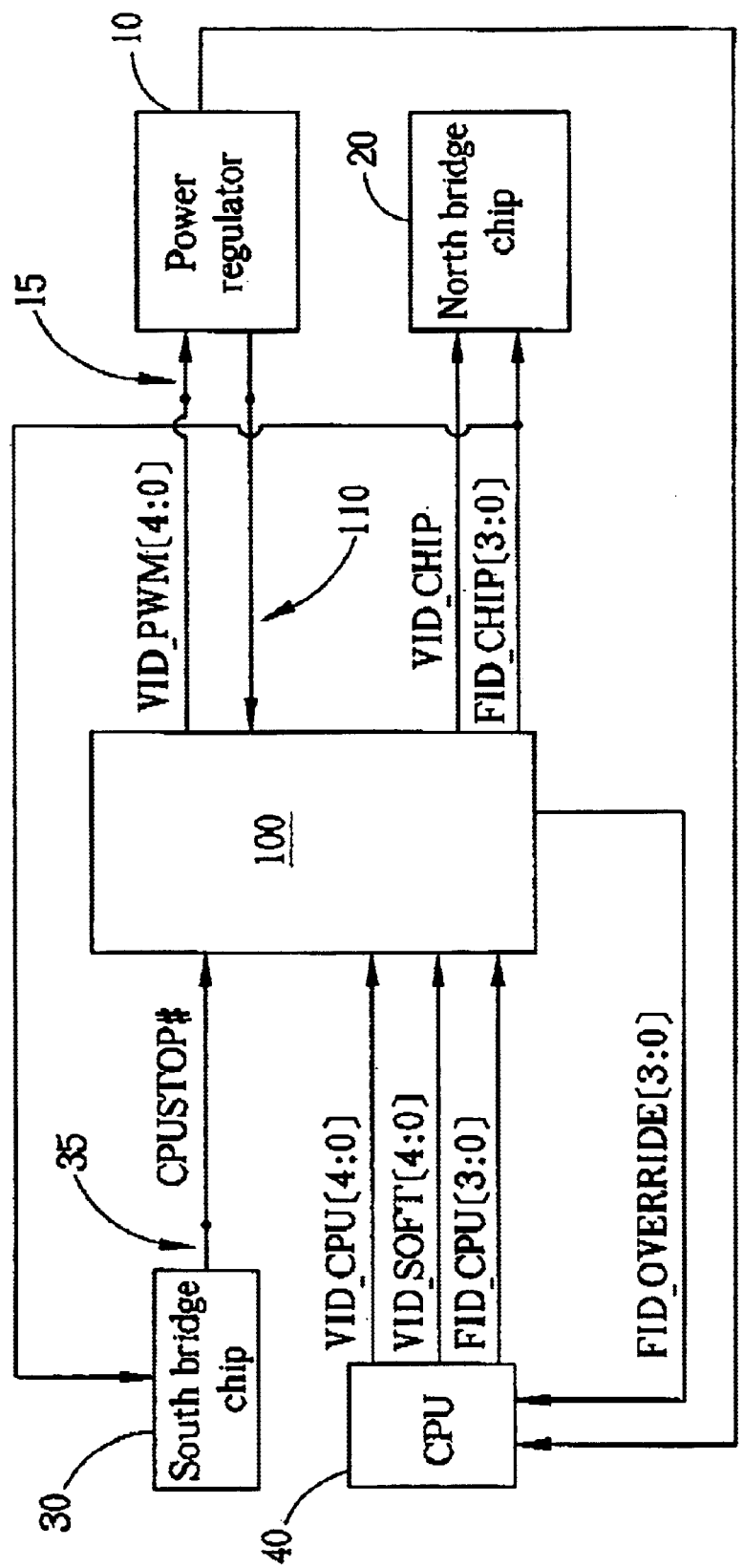
FIG. 2 is a block diagram of a computer system utilizing the integrated circuit of FIG. 1.

Please refer to FIG. 1 and FIG. 2. FIG. 1 is a block diagram of an integrated circuit 100 according to the present invention. FIG. 2 is a block diagram of a computer system utilizing the integrated circuit 100. The integrated circuit 100 is designed to provide support for a computer system that includes a power regulator 10, a north bridge chipset 20, a south bridge chipset 30, and a CPU 40. The power regulator 10 provides a core voltage for the CPU 40 according to five Voltage Identification power management (VID_PWM) input lines 15. The VID_PWM input lines 15 are used to pass a Voltage Identification (VID) value to the power regulator 10, and the power regulator 10 then provides a specific voltage to the CPU 40 according to the VID value. The VID_PWM input lines have an operational voltage of 5V. That is, a logical one is at 5V, and a logical zero is at ground. The integrated circuit 100 includes a plurality of input lines and a plurality of output lines. The input lines include a single CPU_SELECT input line, five VID_SOFT input lines, five VID_CPU input lines, a CPUSTOP# input line, four CPU Frequency Identification (FID_CPU) input lines, a plurality of power signal input lines 110, and two serial data input lines 120. The output lines include five VID_PWM output lines (which correspond to the five VID_PWM input lines 15 for the power regulator 10), a single VID_CHIP output line, four FID_OVERRIDE output lines, and four FID_CHIP output lines. The CPU_SELECT input line is used to indicate whether the CPU 40 is a mobile-type CPU or a desktop-type CPU, and has an operational voltage of 3.3V. The VID_SOFT input lines are used to accept a programmable VID value from the CPU 40, and have an operational voltage of 2.5V. The programmable VID value passed by the VID_SOFT input lines indicates a core voltage that the CPU 40 is currently requesting, and hence may change from time to time, depending upon power management routines being run by the CPU 40. The VID_CPU input lines are used to accept a default VID value from the CPU, and have an operational voltage of 2.5V. The default VID value is fixed with the CPU 40, and hence does not change. The CPUSTOP# input line is used to accept a corresponding CPUSTOP# signal line 35 from the south bridge chip 30, and has an operational voltage of 3.3V. The CPUSTOP# input line is used to indicate a stop grant state of the CPU 40, i.e., whether or not the CPU 40 is in a sleep state. The CPUSTOP# input line is generally active low. The FID_CPU input lines are used to accept a Frequency Identification (FID) value from the CPU 40 that indicates an operational frequency of the CPU 40. The FID_CPU input lines have an operational voltage of 2.5V. The VID_PWM output lines are used to pass a VID value to the power regulator 10, and hence to control the core voltage of the CPU 40. The VID_PWM output lines have an operational voltage of 5V. The VID_CHIP output line is used to pass a signal to the north bridge chip 20 to inform the north bridge chip 20 that the core voltage of the CPU 40 is switching from a generally high value to a generally low value, or vice versa. The state of the VID_CHIP output line corresponds exactly to the state of the most significant bit of the VID value passed on the VID_PWM output lines. The VID_CHIP output line may have an operational voltage of 2.5V or 3.3V. The FID_CHIP output lines are used to pass an FID value to the north bridge chip 20 and/or the south bridge chip 30. The FID value indicates the operational frequency of the CPU 40. The FID_CHIP output lines have an operational voltage of 3.3V. The FID_OVERRIDE output lines are used to override the operational frequency of the CPU 40, and hence pass an FID value to the CPU 40. The FID_OVERRIDE output lines have an operational voltage of 2.5V. The FID value passed by the FID_OVERRIDE output lines always matches the FID value passed by the FID_CHIP output lines. Note that not all CPUs 40 may accept overriding of the CPU operational frequency.

Internally, the integrated circuit 100 includes a power detection circuit 120, an FID logic circuit 130, and a VID logic circuit 140. The power detection circuit 120 is used to generate a PWRGOOD# signal according to the power signal input lines 110. The PWRGOOD# signal indicates whether or not the electrical power generated by the power regulator 10 is satisfactory. The FID logic circuit 130 is used to generate the FID value that is passed out on the FID_OVERRIDE output lines and the FID_CHIP output lines. The VID logic circuit 140 is used to generate the VID value that is passed out in full on the VID_PWM output lines, and in part on the VID_CHIP output line. Both the VID logic circuit 140 and the FID logic circuit 130 utilize a programmable table 150. The programmable table 150 includes a programmable FID table 153 and a programmable VID table 154. The serial data input lines 120 are used to program both the programmable FID table 153 and the programmable VID table 154. The serial data input lines 1 20 conform to the SMBus industry standard, and include an SMBDATA input line and an SMBCLOCK input line.

The FID logic circuit 130 includes an FID level shift 132, an FID override multiplexer (MUX) 134, and the programmable FID table 153. The FID level shift 132 bumps the operational voltage of the FID_CPU input lines up from 2.5V to 3.3V, generating an FIDOUT signal at 3.3V. The FIDOUT signal carries the same FID value carried by the FID_CPU input lines, but has an operational voltage of 3.3V. The programmable FID table 153 generates an FID_PRGM signal that corresponds to the value programmed into the FID table 153 by the serial input lines 120. Both FIDOUT and FID_PRGM feed into the FID override MUX 134. The FID override MUX 134 will select the FIDOUT signal to generate the FID value passed on the FID_CHIP output lines if the FID table 153 has not been programmed. If the FID table 153 has been programmed, then the FID override MUX 134 uses the FID value passed by FID_PRGM as the FID value passed on the FID_CHIP output lines. In general, programming the FID table 153 involves setting at least one bit in the FID table 153 to zero. Hence, if any bit in the FID table 153 is zero, then the value in the FID table 153 is selected by the FID override MUX 134 and passed out onto the FID_CHIP output lines. Otherwise, the value passed by FIDOUT is used for the FID_CHIP output lines.

Desktop-type CPUs generally utilize one of two voltages for the core voltage: a default voltage while operating under normal operating conditions, and a sleep voltage when the CPU 40 is sleeping, as indicated by the CPUSTOP# signal line 35. The VID logic circuit 140 thus includes five default sleep VID lines 141 that are tied either high or low to generate an appropriate VID value that corresponds to a sleep voltage for a desktop-type CPU. The default sleep VID lines, together with the VID_CPU input lines, feed into desktop VID MUX 142 within the VID logic circuit 140 to generate a DKTP signal. The DKTP signal will have the VID value passed by the default sleep VID lines 141 if either the CPUSTOP# input line indicates that the CPU 40 is in a sleep state, or if the PWRGOOD# signal line indicates that the electrical power supplied by the power regulator 10 is not suitable for use. If the CPUSTOP# input line indicates that the CPU 40 is not sleeping, and the PWRGOOD# signal line indicates that suitable power conditions are present, then the desktop VID MUX 142 will select the VID value passed by the VID_CPU input lines as the value for the DKTP signal.

Mobile-type CPUs, on the other hand, always explicitly state their required core voltage. Hence, a mobile VID MUX 144 within the VID logic circuit 140 selects either the VID value passed by the VID_SOFT input lines or the VID value passed by the VID_CPU input lines to generate an MBL signal. The MBL signal will carry the VID value passed by the VID_SOFT input lines if the PWRGOOD# signal line indicates that suitable power conditions are present. Otherwise, the MBL signal line will carry the VID value passed by the VID_CPU input lines. The MBL signal lines and the DKTP signal lines feed into a CPU-type MUX 146 within the VID logic circuit to generate a VIDOUT signal. The CPU-type MUX 146 causes the VIDOUT signal to equal the MBL signal if the CPU_SELECT input line indicates that the CPU 40 is a mobile-type CPU. Otherwise, the CPU-type MUX 146 causes the VIDOUT signal to equal the DKTP signal. Rather than passing the VIDOUT signal directly to the VID_PWM output lines, the integrated circuit 100 enables the VID value to be overridden by way of the VID table 154. The programmable VID table 154 generates a VID_PRGM signal that corresponds to the value programmed into the VID table 154 by the serial input lines 120. Both VIDOUT and VID_PRGM feed into a VID override MUX 148. The VID override MUX 148 will select the VIDOUT signal to generate the VID value passed on the VID_PWM output lines if the VID table 154 has not been programmed. If the VID table 154 has been programmed, then the VID override MUX 148 uses the VID value passed by VID_PRGM as the VID value passed on the VID_PWM output lines. In general, programming the VID table 154 involves setting at least one bit in the VID table 154 to zero. Hence, if any bit in the VID table 154 is zero, then the value in the VID table 154 is selected by the VID override MUX 148 and passed out onto the VID_PWM output lines. Otherwise, the value passed by VIDOUT is used for the VID_PWM output lines. Note that the VID values specified by the VID_SOFT and the VID_CPU input lines must be respectively level shifted up to the operational voltage of the VID_PWM output lines. This may be performed in a variety of places within the VID logic circuit 140. In the instant circuit 100, it is the mobile VID MUX 144 and the desktop VID MUX 142 that level shift the VID_SOFT and VID_CPU input lines, respectively. Hence, the MBL signal lines and the DKTP signal lines will have an operational voltage of 5V. A driving circuit 149 is connected to the VID_PWM output line that corresponds to the most significant bit of the VID value presented by the VID_PWM output lines. The driving circuit 149 level shifts the voltage from 5.0V operational to either 2.5V or 3.3V operational, and thus presents the VID_CHIP output line.

Figure 3:
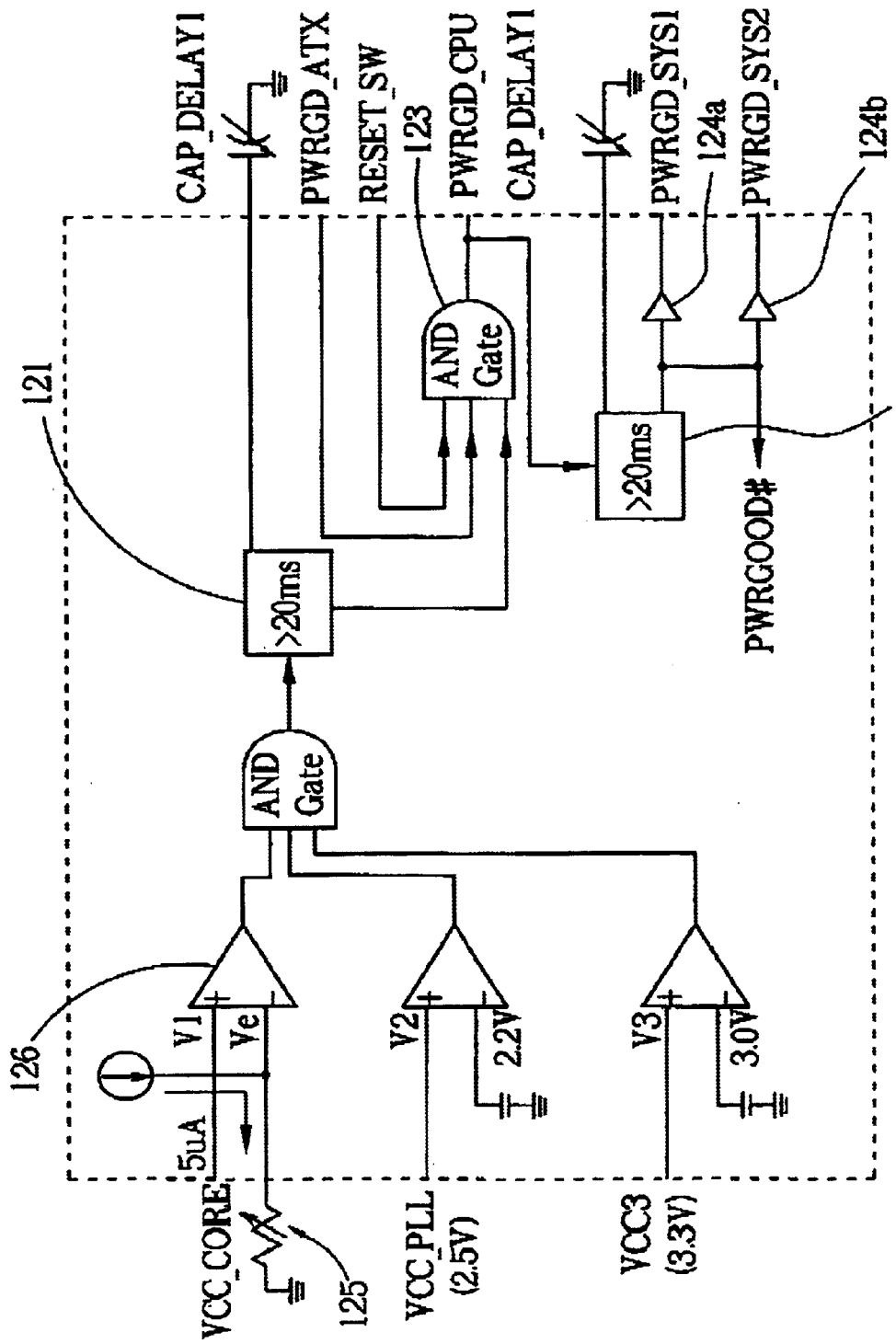
FIG. 3 is a circuit diagram of a power detection circuit shown in FIG. 1.

Please refer to FIG. 3. FIG. 3 is a circuit diagram of the power detection circuit 120. The power detection circuit 120 requires various input signal lines, and provides various output signal lines. In particular, a power good signal PWRGD_CPU is provided as an output signal for the CPU 40. Typical motherboard designs require power-sequencing circuitry for Socket-A processor PLL startup protection. Therefore, the PWRGD_CPU output signal is held low until VCC_CORE (core voltage for the CPU 40, as provided by the power regulator 10 according to the VID_PWM input lines 15), VCC_PLL (CPU 40 PLL voltage provided by the power regulator 10, 2.5V) and VCC3 (3.3V system power provided by the power regulator 10) are all valid. Two delay elements 121 and 122 are included in the power detection circuit 120. The first delay element 121 is about a 20 ms delay controlled by an external capacitor through a CAP_DELAY1 input line to ensure that VCC_CORE, VCC_PLL and VCC3 are all stable. The PWRGD_CPU output signal is then provided as an output signal affirming stable power resources. A further 20 ns delay is imposed upon the PWRGD_CPU signal by the second delay element 122 to then generate two output signals PWRGD_SYS1 and PWRGD_SYS2 to the rest of the major components of the computer system, such as the north bridge 20 and the south bridge 30. PWRGD_SYS1 and PWRGD_SYS2 are appropriately level shifted as required by driving circuits 124a and 124b, respectively. The internal PWRGOOD# signal is pulled from the output of the second delay element 122. Note that further inputs into AND gate 123 that generates the PWRGD_CPU output signal include RESET_SW, which is a Schmitt-Trigger input signal from a reset button (not shown), and PWRGD_ATX, which is a power good input signal from the power regulator 10. An external resistor 125 is used to adjust a voltage Ve into operational amplifier 126 that verifies a suitable core voltage as measured by input line VCC_CORE from the power regulator 10. Ve should be about 1.1V for desktop-type CPUs 40, and 0.9V for mobile-type CPUs 40.

In contrast to the prior art, the present invention provides a single integrated circuit to interface a CPU with various components within a computer system. This single integrated chip uses both the voltage identification (VID) and frequency identification (FID) signals from the CPU to generate a voltage identification signal for a power regulator, and a frequency identification signal for a north bridge chipset. The integrated circuit may optionally provide overrides for both the frequency and the voltage of the CPU. By providing a single integrated circuit to manage these signals from the CPU, space is saved on the motherboard, design layout is simplified and overall production costs are reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An integrated circuit adapted for supporting a processor, the integrated circuit comprising:

an input line for indicating a type of said processor;

a plurality of input lines for indicating a programmable core voltage requested by said processor;

a plurality of input lines for indicating a default core voltage of said processor;

an input line for indicating a sleep state of said processor;

a plurality of input lines for indicating a processor operating frequency;

a plurality of power signal input lines;

a plurality of output lines for providing a Frequency-Identification value to a North Bridge chipset or a South Bridge chipset, said Frequency-Identification value corresponding to an operating frequency of said processor;

a plurality of output lines for overriding an internal Frequency-Identification code of said processor; and a power detection circuit for determining suitability of electrical power provided by a power regulator according to said power signal input lines and providing an associated Power-Good signal line.

2. The integrated circuit of claim 1 further comprising:

a programmable Voltage-Identification override table;

a programmable Frequency-Identification override table;

a serial data input line for programming said Voltage-Identification override table and said Frequency-Identification override table; and a plurality of output lines for passing a Voltage-Identification value to said power regulator.

3. The integrated circuit of claim 2 further comprising a plurality of default sleep Voltage-Identification lines corresponding to a default sleep voltage for said processor.

4. The integrated circuit of claim 3 further comprising a Voltage-Identification logic circuit for generating said Voltage-Identification value, said Voltage-Identification logic circuit comprising:

a desktop Voltage-Identified multiplexer for generating a DKTP value from said input lines for indicating a default core voltage of said processor and said default sleep Voltage-Identification lines according to said input line for indicating a sleep state of said processor and said Power-Good signal line;

a mobile Voltage-Identification multiplexer for generating an MBL value from said input lines for indicating a default core voltage of said processor and said input lines for indicating a programmable core voltage requested by said processor according to said Power-Good signal line;

a CPU-type multiplexer for generating a VIDOUT value from said MBL value and said DKTP value according to said input line for indicating a type of said processor; and a Voltage-Identification override multiplexer for generating a value from said VIDOUT value and said value in said programmable VID overrride table.

5. The integrated circuit of claim 4, wherein said DKTP value equals said value of said input lines for indicating a default core voltage of said processor if said Power-Good signal line indicates suitable power conditions and said input line for indicating a sleep state of said processor indicates that said processor is not sleeping, otherwise said DKTP value equals said value of said default sleep Voltage lines.

6. The integrated circuit of claim 4, wherein said MBL value equals said value of said input lines for indicating a default core voltage of said processor if said Power-Good signal line does not indicated suitable power conditions, otherwise said MBL value equals said value of said input lines for indicating a programmable core voltage requested by said processor.

7. The integrated circuit of claim 4, wherein said VIDOUT value equals said MBL value if said input line for indicating a type of said processor indicates a mobile-type CPU, otherwise said VIDOUT value equals said DKTP value.

8. The integrated circuit of claim 4, wherein if any bits in a value of said programmable VID override table are zero, then said Voltage-Identified value equals said value of said programmable Voltage-Identified override table, otherwise said Voltage-Identified value equals said VIDOUT value.

9. The integrated circuit of claim 4 further comprising a Frequency-Identification logic circuit for providing a Frequency-Identification value to said North Bridge chipset or said South Bridge chipset, said Frequency-Identification logic circuit comprising a Frequency-Identification override multiplexer for generating said a Frequency-Identification value from said input lines for indicating a processor operating frequency and said value of said programmable FID override table.

10. The integrated circuit of claim 9, wherein if any bits in a value of said programmable Frequency-Identification overrride table are zero, then said Frequency-Identification value equals said value of said programmable Frequency-Identification override table, otherwise said Frequency-Identification value equals a value from said input lines for indicating a processor operating frequency.

11. The integrated circuit of claim 4 wherein a first operational voltage is used by said input lines for indicating a programmable core voltage requested by said processor, said input lines for indicating a default core voltage of said processor, said input lines for indicating a processor operating frequency and said output lines for overriding a internal Frequency-Identified code of said processor, wherein a second operational voltage is used by said input line for indicating a type of said processor, said input line for indicating a sleep state of said processor, said serial data input line and said output lines for providing said Frequency-Identification value to said North Bridge chipset or said South Bridge chipset, and wherein a third operational voltage is used by said output lines for passing said Voltage-Identification value to said power regulator.

12. The integrated circuit of claim 11 wherein said first operational voltage is 2.5V, said second operational voltage is 3.3V, and said third operational voltage is 5.0V.

13. The integrated circuit of claim 11 further comprising and output line for indicating a default core voltage of said processor that utilizes said first operational voltage, a value of said output line for indicating a default core voltage of said processor being equal to a value of a most significant bit of said output lines for passing said Voltage-Identification value to said power regulator.

14. The integrated circuit of claim 11 further comprising an output line for indicating a default core voltage of said processor that utilizes said second operational voltage, a value of said output line for indicating a default core voltage of said processor being equal to a value of a most significant bit of said output lines for passing said Voltage-Identification value to said power regulator.

* * * * *